(12) United States Patent
Grieve et al.

(10) Patent No.: US 6,670,972 B2
(45) Date of Patent: Dec. 30, 2003

(54) USER INTERFACE

(75) Inventors: Richard Grieve, Bristol (GB); Jeremy Ashley, San Francisco, CA (US); James Adam Steadman, Bradlow Ledbury (GB); Robert Lloyd Lavender, Nr Wedmore (GB)

(73) Assignee: Oracle International Corporation, Redwood Shores, CA (US)

( * ) Notice: Subject to any disclaimer, the term of this patent is extended or adjusted under 35 U.S.C. 154(b) by 497 days.

(21) Appl. No.: 09/730,751

(22) Filed: Dec. 7, 2000

(65) Prior Publication Data

US 2002/0036657 A1 Mar. 28, 2002

(51) Int. Cl.$^7$ ................................................ G09G 5/00
(52) U.S. Cl. ...................... 345/772; 345/833; 711/170
(58) Field of Search ................................. 345/771, 772, 345/773, 786, 833; 711/100, 170

(56) References Cited

U.S. PATENT DOCUMENTS 6,362,829 B1 * 3/2002 Omvik et al. ............... 345/593
6,532,469 B1 * 3/2003 Feldman et al. ............ 707/102

\* cited by examiner

*Primary Examiner*—Ba Huynh
(74) *Attorney, Agent, or Firm*—Swidler Berlin Shereff Friedman, LLP

(57) ABSTRACT

The present invention relates to a user interface control for controlling the value of a variable in a processing system. The user interface control includes, a display, an input device and a processor. The processor is adapted to cooperate with the display and the input device to generate an input representation on the display, the input representation allowing the value of the variable to be specified by the user using the input device. The processor then generates a graphical representation on the display, the graphical representation showing a relationship between the variable and a parameter. Finally, the processor generates an indicator on the display, the indicator indicating a value of the parameter for the value of the variable specified using the input representation.

7 Claims, 3 Drawing Sheets

USER INTERFACE

FIELD OF THE INVENTION

The present invention relates to a user interface control and, in particular to a slider user interface control for use with a processing system.

DESCRIPTION OF THE PRIOR ART

In many software applications, it is possible to adjust a variable to modify either the operation of the software or a feature provided by the software. One such example, is the ability to control the amount of memory which is utilized by a software application. In general, the alteration of such a variable will cause some alteration in the operation of the application, such as altering the efficiency of the application, the appearance of an output, or the like.

An example of this can be found in database systems which utilise summaries of regular queries to improve the response time of the database. In this case, the amount of memory allocated for storing the database summaries can vastly effect the time taken for the database to respond to a query.

A number of different techniques are provided for adjusting the value of such variables.

A first system for allowing a variable to be altered is shown in FIG. 1. In this case, a text box 1 is provided with an associated spinner control 2. In use, the system user can enter a variable in the text box and either increase or decrease the value by selecting the appropriate button of the spinner control 2. In this case, the system also usually indicates at 3 the maximum value that can be set for the variable.

A second solution is shown in FIG. 2. This system uses a slider control 4. The value of the variable is set to a minimum at one end point 4A of the slider control 4 and to a maximum at the other end point 4B. The value of the variable is therefore set by moving a pointer 5 along the slider control 4 between the end points 4A, 4B, so as to select the value.

Whilst both of these systems allow the variable to be adjusted, they both suffer from the drawback that they do not provide an indication of what effect the alteration will have. Accordingly, if the user wants to know if adjusting the variable will improve the performance of the system under question, then the user must adjust the value of the variable and then compare how the software performs following the alteration. As will be appreciated by the skilled man, with some systems it can take several hours to assess any alteration in system performance.

A third solution, which is shown in FIG. 3, is the use of a graph 6. In this example, the graph 6 indicates the value of the variable along the x-axis, with any change in performance being indicated along the y-axis. This is usually used in conjunction with a text box similar to that shown in FIG. 1. In this case, when the user comes to alter the variable, the graph provides a rough indication of how changes will effect the performance. However, this is only a rough guide from which the user can determine that an increase in the variable will result in an increase in performance, but not how much of an increase will occur.

SUMMARY OF THE INVENTION

The present invention provides user interface control for controlling the value of a variable in a processing system, the user interface control comprising:

a. a display;
b. an input device; and,
c. a processor which is adapted to cooperate with the display and the input device to:
   i. generate an input representation on the display, the input representation allowing the value of the variable to be specified by the user using the input device;
   ii. generate a graphical representation on the display, the graphical representation showing a relationship between the variable and a parameter; and,
   iii. generate an indicator on the display, the indicator indicating a value of the parameter for the value of the variable specified using the input representation.

Accordingly, the present invention provides a user interface which allows the user to adjust the value of a variable and instantaneously observe how the alteration will effect the operation of the processing system.

The input representation preferably comprises a slider moveable between two end points, the position of the slider relative to the end points representing the value of the variable. The use of a slider is not essential, although it is particularly advantageous as it provides the user with a pictorial representation of the value of the variable which is conceptually easy to understand. However, alternative representations such as an input dial or the like could be used.

The graphical representation typically comprises a graph showing the value of the variable along a first axis and the value of the parameter along the second axis. Again this is conceptually easy for the user to understand. In addition to this however, the graph provides the user with an indication of the relationship between the variable and the parameter, allowing the user to see how changes in the value of the variable will effect the value of the parameter.

In this case, the input representation is preferably arranged adjacent the first axis of the graphical representation such that the position of the slider with respect to the first axis represents the value of the variable. This allows the user to see a correspondence between the value of the variable as set on the slider and the corresponding value on the graph. This in turn allows the user to visualise how adjustments of the value of the variable will effect the value of the parameter.

The indicator usually comprises a line intersecting the second axis, the position of the intersection representing the value of the parameter. However, alternative indicators, such as highlighting regions of the graph, displaying the value of the parameter numerically along side the graph axis, or the like could be used.

Similarly, the indicator usually intersects the first axis, the position of the intersection representing the value of the variable, although other display techniques could be used.

In the case in which the processing system is used to control the creation of summaries in a database, the variable preferably corresponds to the amount of memory allocated for the summaries, the parameter indicating the improvement in the performance of the database. However, the user control interface can be used for representing other variables, such as the amount of memory allocated to certain processing tasks, with the parameter representing the time the task will take.

The system can also be used for other applications, including for example to represent the benefit that is obtained when allocating different amounts of memory for the swap files used by the Windows™ system.

Typically the processing system is adapted to determine the relationship between the variable and a parameter. The manner in which this is achieved is not essential to the present invention. However, one example is described in the co-pending British Patent Application No. 0014217.4, filed on Jun. 9, 2000.

The processor, the display and the input device usually form part of the processing system, although it is possible for the user interface control to be provided using elements separate to those in the processing system, thereby allowing the user interface control to be located remotely from the processing system.

The graphical representation may advantageously indicate a maximum value of the variable which can be specified. This allows the user to observe the maximum value of the parameter which can be obtained. Thus, for example, if the system is used to control the memory allocation for summary creation, the maximum value would correspond to the total memory available. In this case, the graphical representation allows the user to observe the maximum improvement in performance that can be obtained.

BRIEF DESCRIPTION OF THE DRAWINGS

An example of the present invention will now be described with reference to the accompanying drawings, in which.

DETAILED DESCRIPTION OF THE DRAWINGS

Figure 4:
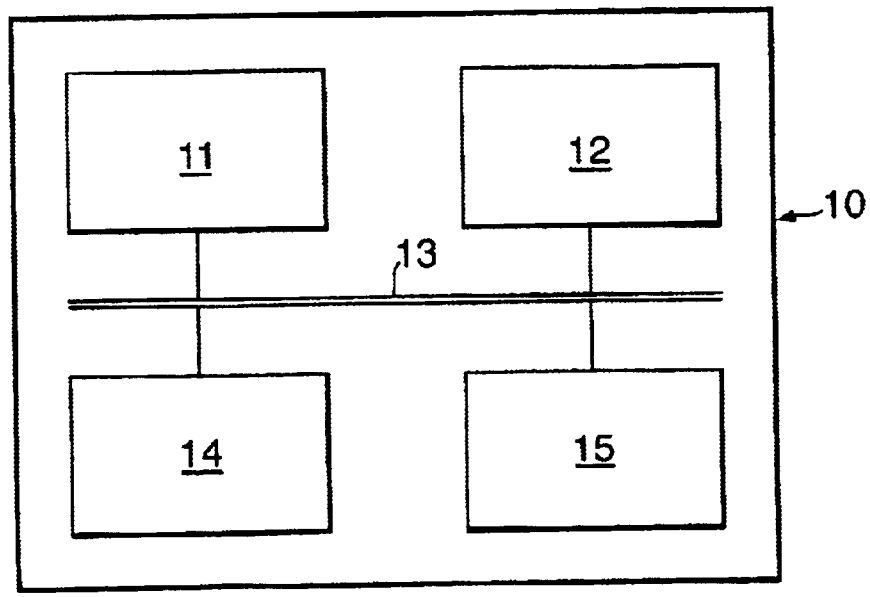

The apparatus shown in FIG. 4 comprises a processor system 10 having a processor 11 and a memory 12 coupled together via a bus 13. Also coupled to the bus 13 is an input device 14, such as a keyboard or mouse, and a display 15.

As will be appreciated by a person skilled in the art, this processing system may be any form of processing system capable of operating appropriate software, such as a computer, a lap top, a palm top, or the like.

In use, the user is able to input commands to the processing system via the input device 14. Information is then presented to the user on the display 15, in the normal manner.

Figure 5A:
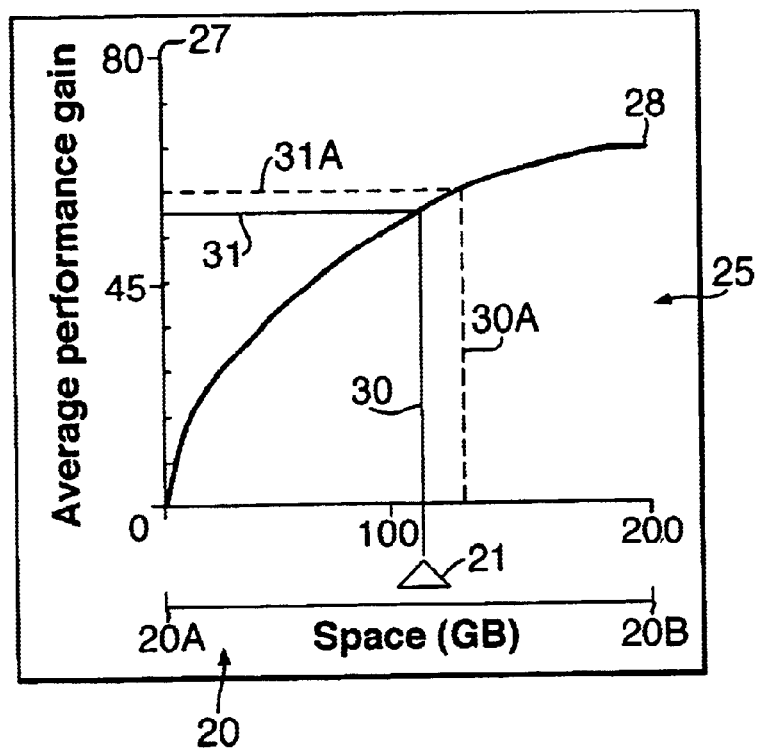

When the processor system is operating in accordance with the present invention, then a user interface is presented to the user on the display 15. The user interface, an example of which is shown in FIG. 5A, includes a slider control 20 and a graph 25.

Figure 1:
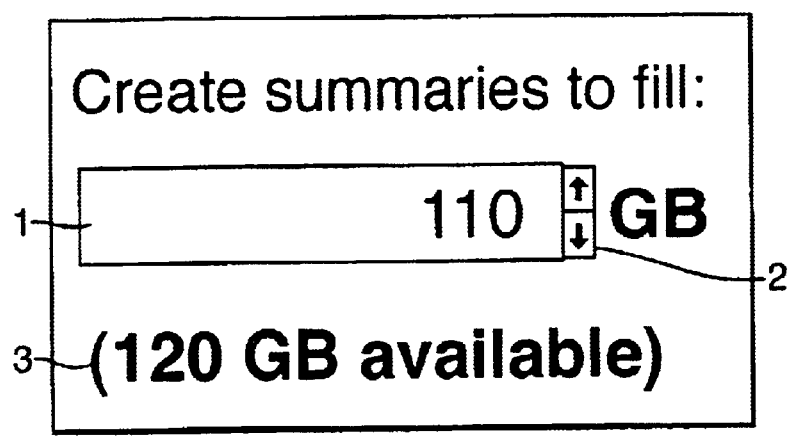
FIG. 1 is a schematic representation of a first user interface according to the prior art.
Figure 2:
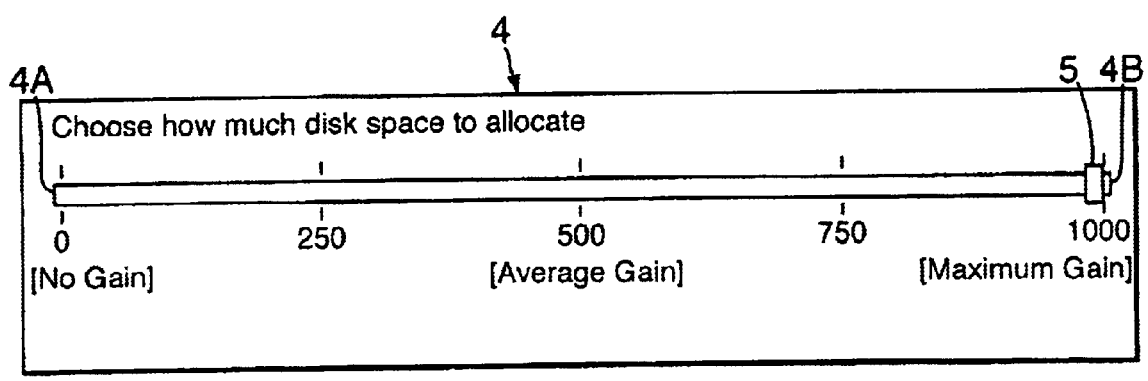
FIG. 2 is a schematic representation of a second example of a user interface according to the prior art.
Figure 3:
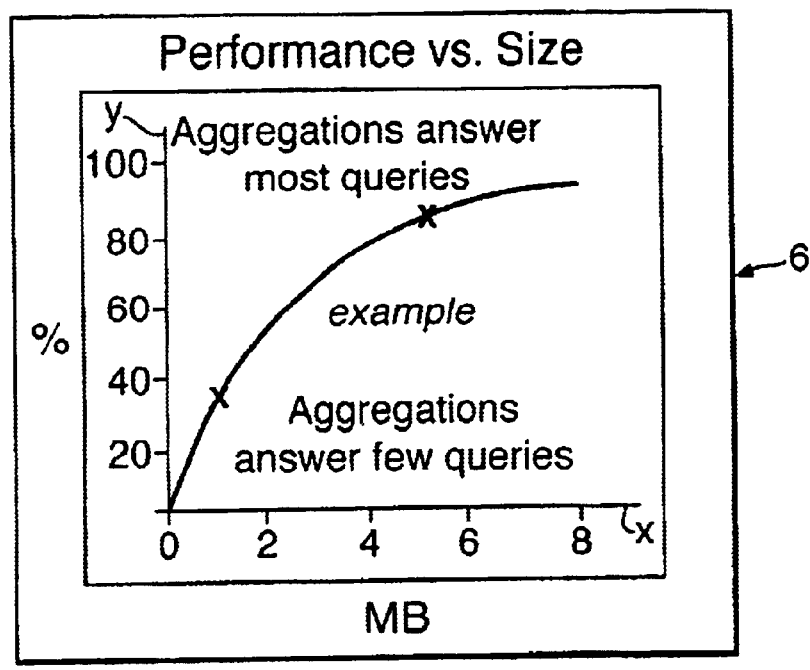
FIG. 3 is a schematic representation of a third example of a user interface according to the prior art; and, FIG. 4 is a schematic representation of a processing system suitable for implementing the present invention; and, FIGS. 5A and 5B are examples of a user interface according to the present invention.

The slider control 20, which operates in a similar manner to the slider control described with respect to FIG. 2, includes first and second ends 20A, 20B and a pointer 21. The position of the pointer 21 on the slider control 20 represents the value of a variable to be altered, with the minimum value of the variable being at the end 20A and the maximum value at the end 20B.

In use, the position of the pointer 21 is controlled by the processor 11 in accordance with signals received from the input device 14, thereby allowing the user to control the pointer position.

In this example, the processing system forms part of a summary creation system for a database. Accordingly, the user interface is configured to allow the user to control the amount of memory which is allocated for the storage of database summaries.

The creation and effect of database summaries is described in more detail in the co-pending British Patent Application No. 0014217.4. However, in general, if the database includes more summaries, it is generally able to respond to queries more quickly, resulting in an increase in the efficiency of the database. Accordingly, as more memory is allocated for the storage of summaries, the efficiency of the database increases. However, because of the way in which summaries are used by the database, the increase in efficiency will begin to level out as the amount of memory allocated continues to increase.

The relationship between the memory assigned and the improvement in efficiency is calculated by the processor 11 and displayed to the user on the graph 25. The relationship is calculated by the processor using known techniques which are described in more detail in the copending British Patent Application No. 0014217.4.

Accordingly, in this example, the indication of memory allocated is provided on the X-axis 26, with the performance gain (improvement in efficiency) being represented by the Y-axis 27 and the relationship between the two being represented by a plotted line 28.

As shown in FIG. 5A, there is a correspondence between the position of the slider control 20 and the X-axis 26. The length of the X-axis 26 and the slider control 20 are identical so that the position of the pointer 21 on the slider 20 represents the amount of memory assigned for summary creation both on the slider 20 and on the X-axis 26.

In use, the processor 11 also generates first and second indicator lines 30, 31. The position of the indicator line 30 corresponds to the amount of memory allocated for database summaries, which is determined by the position of the pointer 21 on the slider control 20. Thus, as shown, the line 30 intersects the X-axis 26 so that it is aligned with the position of the pointer 21 to represent the amount of allocated memory. The indicator line 31 then runs from the plotted line 28 across to the Y-axis 27 to indicate the corresponding performance gain obtained for the specified memory allocation.

Figure 5B:
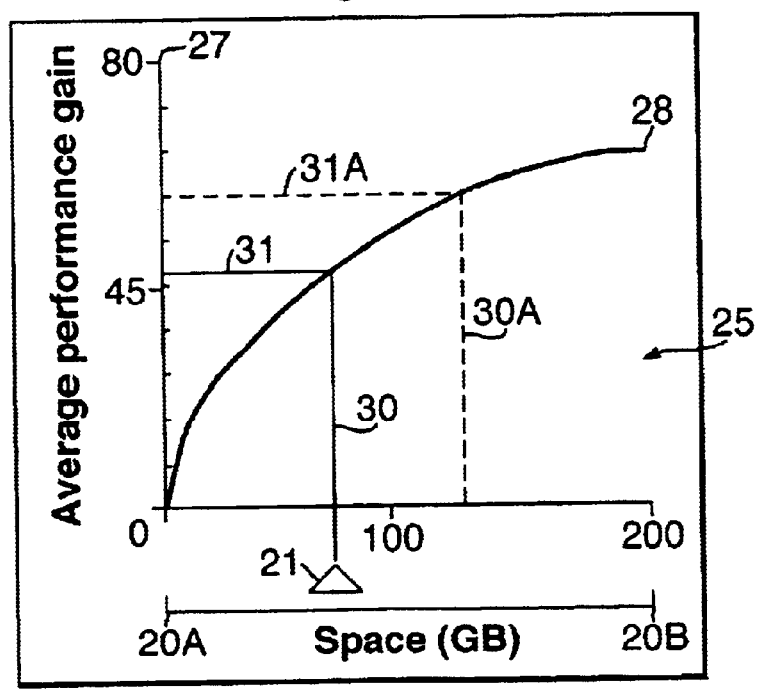

As the user inputs a command causing the pointer 21 to be moved, the processor 11 is adapted to cause corresponding movement of the indicator lines 30 and 31. Accordingly, the processor redraws the graph instantly with the indicator lines repositioned in accordance with the input. Accordingly, the user will be presented with an updated graph indicating the new database efficiency that will be achieved with the specified memory allocation. An example of a redrawn graph is shown in FIG. 5B. In this case, the user has moved the position of the pointer 21 from a memory allocation of approximately 115 GB, as shown in FIG. 5A, to a memory allocation of approximately 75 GB. Accordingly, the processor redraws the graph with the indicator lines 30 and 31 repositioned to correspond to the new pointer position, as shown in FIG. 5B. A further feature of the present invention is that the processor 11 is adapted to determine what values the variable can take. In this example, the processor 11 determines the maximum amount of memory that can be allocated for summary creation (about 130 GB), and indicates this maximum value on the graphs as the dotted line 30A. A second maximum indicator line, represented by the dotted line 31A, running from the plotted line 28 to the Y-axis is also included as shown. The point at which the line 31A intercepts the Y-axis therefore represents the maximum performance gain that can be achieved with the available memory.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

We claim:

1. A user interface control for controlling the value of a variable in a processing system, the user interface control comprising:
   a. a display;
   b. an input device; and,
   c. a processor which is adapted to cooperate with the display and the input device to control the creation of summaries in a database by:
      i. generating an input representation on the display, the input representation allowing the value of a variable to be specified by the user using the input device, wherein the variable corresponds to an amount of memory allocated for the summaries;
      ii. generating a graphical representation on the display, the graphical representation showing a relationship between the variable and a parameter, the parameter indicating an improvement in performance of the database;
      iii. determining a relationship between the amount of memory allocated for the summaries and the improvement in performance of the database;
      iv. generating an indicator on the display, the indicator indicating the determined improvement in performance of the database for the amount of memory allocated for the summaries specified using the input representation and wherein the input representation is arranged adjacent to a first axis of the graphical representaion such that a position of a slider with respect to the first axis represents the value of the variable.

2. A user interface control according to claim 1, wherein the input representation comprises a slider moveable between two end points, the position of the slider relative to the end points representing the value of the variable.

3. A user interface control according to claim 2, wherein the graphical representation comprises a graph showing the value of the variable along a first axis and the value of the parameter along the second axis.

4. A user interface according to claim 3, wherein the indicator comprises a line intersecting the second axis, the position of the intersection representing the value of the parameter.

5. A user interface according to claim 3, wherein the indicator intersects the first axis, the position of the intersection representing the value of the variable.

6. A user interface control according to claim 1, wherein the processor, the display and the input device form part of the processing system.

7. A user interface control according to claim 1, wherein the graphical representation indicates a maximum value of the variable which can be specified.

* * * * *

UNITED STATES PATENT AND TRADEMARK OFFICE
CERTIFICATE OF CORRECTION

PATENT NO.  : 6,670,972 B2
DATED       : December 30, 2003
INVENTOR(S) : Richard Grieve et al.

It is certified that error appears in the above-identified patent and that said Letters Patent is hereby corrected as shown below:

Title page,
Item [75], Inventors, "Bradlow Ledbury (GB)" should be -- Bath (GB) --.
Insert the following item:
-- [30]   Foreign Application Priority Data
September 26, 2000   (GB) .................. 0023588.7 --.

Column 6,
Line 8, "representation", first occurrence, should be -- representation; --.

Signed and Sealed this

Twenty-seventh Day of April, 2004

JON W. DUDAS
*Acting Director of the United States Patent and Trademark Office*